US010405260B2

(12) United States Patent
Zavesky et al.

(10) Patent No.: US 10,405,260 B2
(45) Date of Patent: Sep. 3, 2019

(54) VEHICLE-BASED MOBILE NODE FLEET FOR NETWORK SERVICE DEPLOYMENT

(71) Applicant: AT&T Intellectual Property I, L.P., Atlanta, GA (US)

(72) Inventors: Eric Zavesky, Austin, TX (US); Zhu Liu, Marlboro, NJ (US); Lee Begeja, Gillette, NJ (US); Yadong Mu, Middletown, NJ (US); David Crawford Gibbon, Lincroft, NJ (US); Bernard S. Renger, New Providence, NJ (US); Raghuraman Gopalan, Union City, CA (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1 day.

(21) Appl. No.: 15/135,139

(22) Filed: Apr. 21, 2016

(65) Prior Publication Data

US 2017/0311228 A1    Oct. 26, 2017

(51) Int. Cl.
*H04W 48/04* (2009.01)
*H04W 4/04* (2009.01)
(Continued)

(52) U.S. Cl.
CPC ........... *H04W 48/04* (2013.01); *H04W 4/027* (2013.01); *H04W 4/029* (2018.02); *H04W 4/04* (2013.01)

(58) Field of Classification Search
CPC ... H04W 84/005; H04W 36/08; H04W 36/32; H04W 48/17; H04W 48/18; H04W 48/20;
(Continued)

(56) References Cited

U.S. PATENT DOCUMENTS

| 6,870,816 | B1 | 3/2005 | Edwards et al. |
| 7,356,389 | B2 | 4/2008 | Holst et al. |

(Continued)

FOREIGN PATENT DOCUMENTS

| CN | 101639979 | 2/2010 |
| CN | 201479382 | 5/2010 |

(Continued)

OTHER PUBLICATIONS

Hubaux, Jean-Pierre, et al. "Toward self-organized mobile ad hoc networks: the terminodes project." Communications Magazine, IEEE 39.1 (2001): 118-124. http://infoscience.epfl.ch/record/362/files/HubauxLGV01.pdf (p. 119 and the "terminoded project" on pp. 120-122).

(Continued)

*Primary Examiner* — Quoc Thai N Vu

(57) ABSTRACT

Devices, computer-readable media, and methods are disclosed for assigning a service to a vehicle-based mobile node. For example, a processor deployed in a communication network may receive a request for the service from a mobile endpoint device, determine a route of the mobile endpoint device, determine a route of the vehicle-based mobile node, and assign the service to the vehicle-based mobile node when the route of the mobile endpoint device and the route of the vehicle-based mobile node coincide.

20 Claims, 4 Drawing Sheets

(51) Int. Cl.
*H04W 4/02* (2018.01)
*H04W 4/029* (2018.01)

(58) Field of Classification Search
CPC ..... H04W 4/001; H04W 4/021; H04W 4/027; H04W 64/003; H04W 64/006; H04W 48/04; H04W 4/029; H04W 4/04
See application file for complete search history.

(56) References Cited

U.S. PATENT DOCUMENTS

| | | |
|---|---|---|
| 7,705,743 B2 | 4/2010 | Barone et al. |
| 8,233,389 B2 | 7/2012 | Vim et al. |
| 8,995,956 B2 | 3/2015 | Lavi et al. |
| 9,225,782 B2 | 12/2015 | Addepalli et al. |
| 2005/0266849 A1 | 12/2005 | Li et al. |
| 2012/0058763 A1* | 3/2012 | Zhao ............... H04W 48/20 455/434 |
| 2014/0126557 A1 | 5/2014 | Kasslatter et al. |
| 2014/0192781 A1 | 7/2014 | Teyeb et al. |
| 2015/0031372 A1* | 1/2015 | Foerster ............ H04W 48/20 455/444 |
| 2015/0181470 A1* | 6/2015 | Chai ............... H04W 36/0005 455/438 |
| 2015/0193219 A1 | 7/2015 | Pandya et al. |
| 2015/0310738 A1 | 10/2015 | Karacan et al. |
| 2015/0312894 A1 | 10/2015 | Chen et al. |

FOREIGN PATENT DOCUMENTS

| | | |
|---|---|---|
| CN | 103347251 A | 10/2013 |
| CN | 103561446 | 2/2014 |
| CN | 104135436 | 11/2014 |
| EP | 2131553 A2 | 9/2009 |
| EP | 2915053 A2 | 9/2015 |
| WO | WO 2012/171585 | 12/2012 |
| WO | WO 2015/144226 | 10/2015 |
| WO | WO 2016/015764 | 2/2016 |
| WO | WO 2015/059496 | 4/2016 |

OTHER PUBLICATIONS

Datta, Anwitaman, Silvia Quarteroni, and Karl Aberer. "Autonomous gossiping: A self-organizing epidemic algorithm for selective information dissemination in wireless mobile ad-hoc networks." Semantics of a Networked World. Semantics for Grid Databases. Springer Berlin Heidelberg, 2004. 126-143. http://infoscience.epfl.ch/record/52599/files/IC_TECH_REPORT_200407.pdf (pp. 5-7 for organizing networks).

Wischhof, Lars, Andre Ebner, and Hermann Rohling. "Information dissemination in self-organizing intervehicle networks." Intelligent Transportation Systems, IEEE Transactions on 6.1 (2005): 90-101. https://www.researchgate.net/profile/Lars_Wischhof/publication/3427913_Information_dissemination_in_self-organizing_intervehicle_networks/links/04076c64e54675feed98c879.pdf (Figures 1-4; pp. 92-94 for hand-off in traffic and Figure 5 for individual vehicle configuration).

Gerla, Mario, and Leonard Kleinrock. "Vehicular networks and the future of the mobile Internet." Computer Networks 55.2 (2011): 457-469. https://www.researchgate.net/profile/L_Kleinrock/publication/222832647_Vehicular_networks_and_the_future_of_the_mobile_internet/links/556b3df808aec226830378ee.pdf (Section 3, Vehicular Application and Internet Requirements from pp. 3-6 and Figures 1-4).

Ebner, Andre, and Hermann Rohling. "A self-organized radio network for automotive applications." Conference Proceedings ITS 2001, 8th World Congress on Intelligent Transportation Systems. 2001. http://citeseerx.ist.psu.edu/viewdoc/download?doi=10.1.1.69.7999&rep=rep1&type=pdf (see the Abstract and Figures 1-3).

Truong, Nguyen B. "Software Defined Networking-Based Vehicular Adhoc Network with Fog Computing", 2015. pp. 1202-1207.

\* cited by examiner

VEHICLE-BASED MOBILE NODE FLEET FOR NETWORK SERVICE DEPLOYMENT

The present disclosure relates generally to network function virtualization, and more particularly to device, computer-readable media, and methods for deploying network services to reconfigurable vehicle-based mobile nodes.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like may be instantiated from the common resource pool.

SUMMARY

In one example, the present disclosure discloses a device, computer-readable medium, and method for assigning a service to a vehicle-based mobile node. For example, a processor deployed in a communication network may receive a request for the service from a mobile endpoint device, determine a route of the mobile endpoint device, determine a route of the vehicle-based mobile node, and assign the service to the vehicle-based mobile node when the route of the mobile endpoint device and the route of the vehicle-based mobile node coincide.

In another example, the present disclosure discloses a device, computer-readable medium, and method for providing a service by a vehicle-based mobile node. For example, a processor of the vehicle-based mobile node may provide route information and capacity information to a controller in a communication network, receive an instruction from the controller to provide the service, load configuration code for the service, receive a request from a mobile endpoint device to connect to the vehicle-based mobile node for receiving the service, and provide the service in response to the request.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
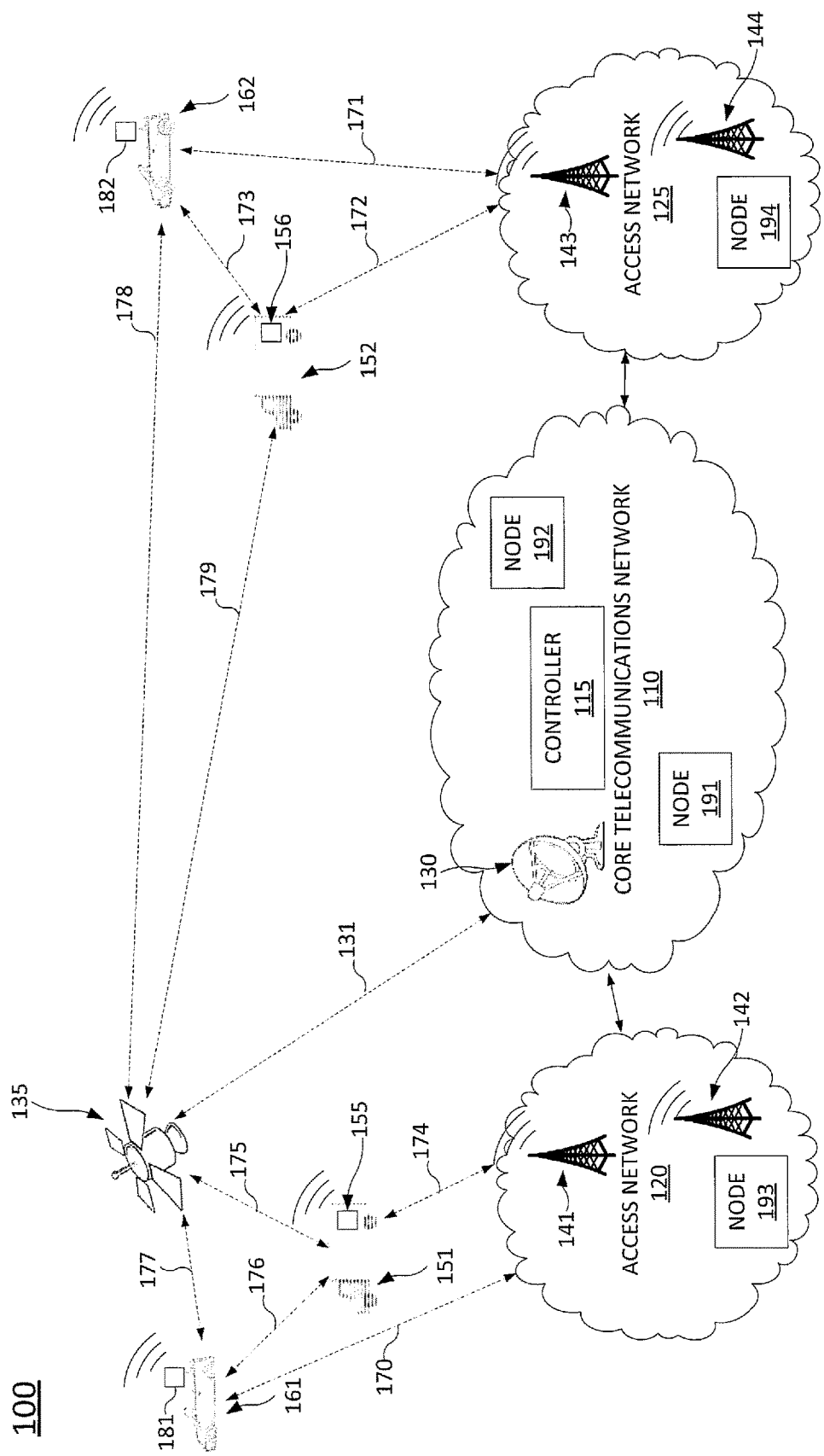
FIG. 1 illustrates an example system related to the present disclosure.

The present disclosure broadly discloses devices, computer-readable media, and methods for assigning a service to a vehicle-based mobile node, and devices, computer-readable media, and methods for providing a service by a vehicle-based mobile node. It should be noted that the term "vehicle-based mobile node" is intended to include all "moving or traveling nodes," e.g., a motor vehicle, a truck, a car, a van, a motorcycle, a boat, a ship, a barge, an aircraft, a plane, a helicopter, a drone, a balloon, a moving platform and the like. In other words, any moving platforms can be modified to provide the functions of the "vehicle-based mobile node" as disclosed below.

In one example, the present disclosure includes a controller, e.g., a software-defined network (SDN) controller, to control the deployment of services, or functions of a communication network to vehicle-based mobile nodes (also referred to herein as vehicle-based mobile SDN nodes). In a software defined network, a SDN controller may instantiate virtual network functions (VNFs) on shared hardware, which may be referred to as network function virtualization infrastructure (NFVI), host devices, or SDN nodes, and which may be physically located in various places. For example SDN nodes may reside in various data centers distributed in different locations. For example, a router may be instantiated on a SDN node, and released when the router is no longer needed. Similarly, a media server may be instantiated on a SDN node, and released when no longer needed. In one example, the configuring, releasing, and reconfiguring of SDN nodes is controlled by the SDN controller, which may store configuration code, e.g., computer/processor-executable programs, instruction, code, or the like for various functions which can be loaded onto an SDN node. In another example, the SDN controller may instruct, or request an SDN node to retrieve appropriate configuration code from a network-based repository, e.g., a storage device, to relieve the SDN controller from having to store and transfer configuration code for various functions to the SDN nodes.

In accordance with the present disclosure, a fleet of vehicles may be deployed where each vehicle includes a mobile SDN node that is in wireless communication with the SDN controller via one or more wireless communication modalities, e.g., via a cellular network, via a satellite communication link, or via another non-cellular wireless technology. In other words, the communication network/software-defined network may be extended to include the vehicle-based mobile SDN node(s). The vehicle-based mobile SDN node(s) may be controlled like other SDN nodes to be configured and reconfigured to provide various network services and/or to perform various tasks and functions. In addition, a vehicle-based mobile SDN node may report a number of parameters to the SDN controller such as: a current location, a speed and direction, a planned route, a current capacity in terms of memory, storage, processor utilization, and so forth. In one example, a vehicle-based mobile SDN node may be integrated with a navigation system, e.g., a Global Positioning System (GPS) navigation system, and other on-board computing resources of the vehicle such that these various parameters may be obtained. In another example, some of the vehicular computing resources may be re-located to the vehicle-based mobile SDN node. For instance, a GPS navigation system may instead be deployed in the vehicle-based mobile SDN node. In one example, a mobile SDN node may comprise eNodeB, femtocell and/or picocell hardware functionality, in addition to being configurable and reconfigurable to provide various additional services. As used herein, the terms "configured" and "reconfigured," and variations thereof, may refer to programming or loading a computing device with computer-readable/computer-executable instructions, code, and/or programs, e.g., in a memory, which when executed by a processor of the computing device, may cause the computing device to perform various functions. In addition, as used herein, the term "services" refers to network services such as a voice call service, a teleconference service, a media delivery service, a data service and so on. For instance, a voice call service may comprise functioning as one or more voice over Internet Protocol (VoIP) network elements, such as a session initiation protocol (SIP) signaling element, media server, a transcoding server, a call control element (CCE), and so forth, a teleconference service may comprise functioning as teleconference bridge, a media delivery service may comprise functioning as a video or audio streaming server, a data service may comprise functioning as a data access server and so forth.

In one example, the SDN controller may also track parameters of mobile endpoint devices, e.g., user devices. The parameters may include the locations, speeds, directions of travel, anticipated routes, electronic calendar entries, social media postings, and so forth. In one example, the SDN controller may further receive service requests and/or content requests from the mobile endpoint devices. For instance, a mobile endpoint device may request a voice or video call to be established with another mobile endpoint device, a conference call to be established with at least two other devices (which may be in mobile or fixed locations), and so forth. In another example, a mobile endpoint device may request a streaming video (which may require both a streaming video service and the video content), streaming music or other audio, and so forth. The request may include an identification of the requesting mobile endpoint device, the service requested, any content requested in addition to the service, a bandwidth requirement, a latency requirement, and so forth. The request may also include geospatial parameters of the mobile endpoint device, such as a location, a speed and direction, a planned route, and so forth. Alternatively, or in addition, the SDN controller may solicit the geospatial parameters of the mobile endpoint device after receiving the request, or may determine the geospatial parameters of the mobile endpoint device independently, e.g., using cellular base station estimation techniques, such as triangulation, signal strength correlations, and so forth.

In accordance with the present disclosure, the SDN controller may utilize the parameters of the requesting mobile endpoint device, e.g., geospatial parameters and other parameters, including physical capabilities such as IEEE 802.11 b, e, ac, etc., IEEE 802.15 or IEEE 802.16, a screen resolution, a memory capacity, a processor speed, and so forth, and software capabilities, such as an installed application, a codec, a digital certificate, and so forth, the parameters of any other mobile endpoint device to be involved in the service (e.g., for a two-way call or conference call), and the parameters of potential vehicle-based mobile SDN nodes for hosting the service in order to select at least one vehicle-based mobile SDN node for deployment of the service. For instance, a user may be a passenger in a vehicle that is traveling along a highway and may make a request for a streaming video service. The SDN controller may receive the request, determine that the mobile device is traveling along the particular highway, and determine an anticipated route that indicates that the mobile endpoint device will remain traveling on the same highway for 30 miles, which may have a speed limit of 65 miles per hour. The SDN controller may then determine candidate vehicle-based mobile SDN nodes in vehicles that are traveling nearby, and with anticipated routes that may coincide with the anticipated route of the requesting mobile endpoint device. As referred to herein, routes may coincide when the routes overlap or when a position of a first device along a first route at a projected time and a position of a second device along a second route at the projected time are within a wireless communication range, e.g., based upon the respective wireless transmission and/or reception capabilities of the first device and the second device. The routes may partially overlap on the same road, or roads, but the vehicles carrying the respective devices do not need to be adjacent, or the vehicles can be on different roads that are nearby.

Continuing with the above example, the SDN controller may determine that there are five trucks with vehicle-based mobile SDN nodes that are traveling along the same portion of a highway, or are anticipated to be traveling along the same portion of the highway at or near the same time as the mobile endpoint device. For instance, the vehicle carrying the mobile endpoint device may have just passed an exit on a highway and the next exit may not be for another 5-15 miles. In this case, it is known that the mobile endpoint device will be more or less locked into that route for the next 5-15 miles and that the vehicle may be "stuck" near a vehicle-based mobile SDN node on a truck or other vehicle that is traveling in the same direction. The SDN controller may determine that at least one of these vehicle-based mobile SDN nodes also has capacity to operate as a video server for at least the next 30 minutes. In anticipation of the proximity of the mobile endpoint device to the at least one vehicle-based mobile SDN node, the SDN controller may then send instructions and/or configuration code to configure the at least one mobile SDN node(s) to function as a video server. In one example, the SDN controller may also load the at least one mobile SDN node with the requested content. Accordingly, when the mobile endpoint device is within wireless communication range of the at least one vehicle-based mobile SDN node, the content may be streamed from the at least one vehicle-based mobile SDN node to the mobile endpoint device.

In one example, the SDN controller may configure multiple vehicle-based mobile SDN nodes to function as a video server. Thus, depending upon the accuracy of the estimates of the anticipated routes, the dynamic traffic conditions and behavior of drivers, changes in routes and drivers' intentions, and so forth, there may be multiple vehicle-based mobile SDN nodes to provide the requested service along all or a portion of the route of the mobile endpoint device. As such, the mobile endpoint device may connect to any one or more of the vehicle-based mobile SDN nodes that are so configured. In one example, a mobile endpoint device may be in a vehicle that is traveling faster than surrounding traffic, including trucks with vehicle-based mobile SDN nodes. Accordingly, the mobile endpoint device may be handed off from one vehicle-based mobile SDN node to the next in an ad hoc manner as the vehicle carrying the mobile endpoint device is passing the other traffic. In one example, configuration code for a service may also be provided from one vehicle-based mobile SDN node to another. Thus, for example, a first vehicle-based mobile SDN node may be separated from a second vehicle-based mobile SDN node over a distance. The route of a mobile endpoint device may first coincide with a route of the first vehicle-based mobile SDN node and later coincide with a route of the second vehicle-based mobile SDN node. While a wireless communication range of the mobile endpoint device may not be able to span the distance, the first vehicle-based mobile SDN node and the second vehicle-based mobile SDN node may still be within a communication range over the distance In addition, it may be determined (e.g., by the SDN controller) that it would be more efficient for the first vehicle-based mobile SDN node to transmit the configuration code directly to the second vehicle-based mobile SDN node (e.g., wirelessly, in a peer-to-peer link) if possible, rather than for the second vehicle-based mobile SDN node to retrieve the configuration code from a network-based repository.

It should be noted that in some cases, fixed cellular network (or non-cellular wireless network) resources may be utilized to support service request from mobile endpoint device. However, in areas of sparse coverage, the requests may not be fulfilled. On the other hand, vehicle-based mobile SDN nodes may be equipped with longer range and/or high bandwidth communication capabilities than mobile endpoint devices. Thus, for example, a video may be downloaded to a vehicle-based mobile SDN node faster than to a mobile endpoint device directly, or over a greater distance, where the mobile endpoint device may be out of range of the cellular (or non-cellular wireless) network. In addition, a vehicle-based mobile SDN node may also be equipped with various "secondary" communication capabilities, e.g., satellite communication capabilities, microwave communication capabilities, WiFi or Wimax communication capabilities, whereas the mobile endpoint devices may simply have the ability to receive GPS signals to determine location, but cannot receive high-bandwidth data over the satellite link or upload high-bandwidth data via the satellite link. In one example, a vehicle-based mobile SDN node can also be configured to function as a cellular base station, such as an eNodeB. For example, vehicle-based mobile SDN node may comprise a cellular transceiver with a higher transmit power such that it can communicate with another nearby base station/eNodeB that a mobile endpoint device cannot reach from the same position. The vehicle-based mobile SDN node may function as a cellular base station, femtocell, or picocell from the perspective of the mobile endpoint device. For instance, the vehicle-based mobile SDN node may provide an initial hop in a multi-hop cellular backhaul. In one example, the requested service may also be configured to run on top of the cellular base station function of the vehicle-based mobile SDN node.

In one example, the SDN controller may attempt to load as much of the configuration code for configuring a vehicle-based mobile SDN node and/or content to be provided at opportune times and locations. For example, if a vehicle-based mobile SDN node is deployed on a truck that is stopped at a traffic light with strong cellular network coverage, the SDN controller may attempt to push as much of the configuration code as possible to the vehicle-based mobile SDN node during the stop at the light. The downloading of configuration code may continue while the truck is in motion. However, the download rate may be reduced or may be interrupted during handoffs between cells. Alternatively, or in addition, the configuration code and content may be transmitted to the mobile SDN node via a satellite link when there is no cellular network coverage, or poor coverage. If the truck stops at another light and there is again strong cellular network coverage, the SDN controller may again push configuration code and/or content to the vehicle-based mobile SDN node at a greater rate. Once the vehicle-based mobile SDN node is configured, it may remain available to provide the service and/or content to the mobile endpoint device if and when the routes of the vehicle-based mobile SDN node and the mobile endpoint device coincide.

In one example, local services (e.g., services that do not require full network connectivity and/or network service provider infrastructure support) or low security services may be preferred candidate services for instantiating in vehicle-based mobile SDN nodes. For example, a voice call between two mobile endpoint devices that are proximate to one another and proximate to a vehicle-based mobile SDN node (e.g., where the routes of the two mobile endpoint devices and the vehicle-based mobile SDN node coincide) may be supported at the vehicle-based mobile SDN node as a Voice over Internet Protocol (VoIP) call, without necessarily requiring that data packets of the call traverse other portions of the communication network infrastructure. For instance, an ad-hoc IP-based wireless local area network (WLAN) may support the call in a self-contained manner if the SDN controller is able to communicate with the vehicle-based mobile SDN node and configure the vehicle-based mobile SDN node to provide a voice call service to support a VoIP call. However, as mentioned above, a vehicle-based mobile SDN node may be equipped with longer range and higher bandwidth transceivers, satellite uplink and/or downlink capabilities, and so forth. Thus, the present disclosure is not limited to local services, but may relate to any number of services where it may be more efficient for a mobile endpoint device to connect to vehicle-based mobile SDN node to access or receive a service, rather than connecting directly to fixed cellular network, WLAN, and/or wide-area network (WAN) infrastructure of a network service provider. As such, examples of the present disclosure may be used to reduce latency for voice or video calls, to reduce latency for delivery of content, and so on. Examples of the present disclosure may also be used to reduce network load in a backhaul and/or a core network.

In one example, the SDN controller may provide instructions to vehicle-based mobile SDN nodes and mobile endpoint devices to connect to one another to fulfill service requests. For instance, an identifier of a vehicle-based mobile SDN node may be provided to a mobile endpoint device that has requested a service. Alternatively, or in addition, the vehicle-based mobile SDN node may be provided with an identifier of the mobile endpoint device. For example, the vehicle-based mobile SDN node may accept or deny a request from the mobile endpoint device to connect to the vehicle-based mobile SDN node based upon the identifier. An identifier of each of the respective devices may comprise, for example: an IP address, a media access control (MAC) address, an international mobile subscriber identity (IMSI), an international mobile equipment identity (IMEI), a mobile subscriber identity number (MSIN), which may be contained within the IMSI, a mobile equipment identifier (MEID), an electronic serial number (ESN) or mobile identification number (MIN), an integrated circuit card identifier (ICCID), a telephone number, e.g., an E.164 number or a number that is translatable into E.164 format, and so forth.

In one example, the SDN controller may also authorize or instruct the vehicle-based mobile SDN node to provide the service to other mobile endpoint devices in the vicinity. For instance, the vehicle-based mobile SDN node may be configured to provide a particular service in response to a request from a mobile endpoint device. At a later time, a different mobile endpoint device may have a request for the same service, and it may be determined that the different mobile endpoint device is already proximate to the vehicle-based mobile SDN node, or will soon be near the vehicle-based mobile SDN node. Thus, the vehicle-based mobile SDN node may be authorized at the time of configuration to provide the service to any requesting mobile endpoint device. Alternatively, or in addition, the vehicle-based mobile SDN node may receive a separate instruction authorizing the vehicle-based mobile SDN node to provide the service to the different mobile endpoint device. For instance, an identifier of the second mobile endpoint device may be provided to the vehicle-based mobile SDN node.

A vehicle-based mobile SDN node may terminate a service based upon instruction from the SDN controller or when one of several criteria are satisfied. For instance, the SDN controller may instruct the vehicle-based mobile SDN node to provide service until the vehicle has travelled a particular distance, until a particular period of time has expired or until a particular time is reached, as long as the vehicle remains on a particular highway, as long as a mobile endpoint device is in communication with the vehicle-based mobile SDN node, until a media content is fully delivered from the vehicle-based mobile SDN node to a mobile endpoint device, until a call between mobile endpoint devices ends, until a particular period of time after a call between mobile endpoint devices ends, and so forth. The vehicle-based mobile SDN node may also terminate service when power is lost, e.g., when the vehicle is turned off, when the vehicle is parked indoors (or parked without power), and so forth.

In one example, vehicle-based mobile SDN nodes may be owned and operated by entities that are different from the network service provider of the communication network in which the SDN controller is deployed. For instance, an enterprise may deploy vehicle-based mobile SDN nodes in a fleet of semi-trucks, delivery trucks, delivery vans, buses, and so forth, and may make the vehicle-based mobile SDN nodes available for use by the telecommunications service provider, e.g., on an as needed basis or on a subscription basis. In any case, the network service provider may deploy network services under the control of network infrastructure, thereby extending the network edge to the vehicle-based mobile SDN node. In one example, certain services may have heightened security requirements. As such, the network service provider may have certain fleet operator partners with vehicle-based mobile SDN nodes that exceed the security requirements for certain services. Services without heighted security requirements may be deployed to any vehicle-based mobile SDN node that meets other criteria, such as a route coinciding with the requesting mobile device, sufficient capacity, etc., while services with the heightened security requirements may be restricted to vehicle-based mobile SDN nodes of the trusted partner fleet operator(s). In one example, a vehicle-based mobile SDN node may have insufficient capacity to host multiple services at the same time. Accordingly, the different services may be prioritized in a variety of different ways. For example, local services operable without the use of a backhaul or other network infrastructure may be prioritized over services that utilize additional network connectivity. These and other aspects of the present disclosure are discussed in greater detail below in connection with the examples of FIGS. 1-4.

To aid in understanding the present disclosure, FIG. 1 illustrates a block diagram depicting one example of a network, or system 100 suitable for performing or enabling the steps, functions, operations, and/or features described herein. The overall communications system 100 may include any number of interconnected networks which may use the same or different communication technologies. As illustrated in FIG. 1, system 100 may include a core telecommunications network 110. In one example, the core telecommunications network 110 may comprise a backbone network, or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs). However, it will be appreciated that the present disclosure is equally applicable to other types of data units and transport protocols, such as Frame Relay, and Asynchronous Transfer Mode (ATM). In one example, the core telecommunications network 110 uses network function virtualization infrastructure (NFVI), e.g., host devices or servers in a data center or data centers that are available as host devices to host virtual machines comprising virtual network functions (VNFs). In other words, at least a portion of the core telecommunications network 110 may incorporate software-defined network (SDN) components. In the example of FIG. 1, NFVI may be represented by nodes 191 and 192.

In one embodiment, the core telecommunications network 110 may be in communication with one or more access networks 120 and 125. The access networks 120 and 125 may include a wireless network (e.g., an Institute of Electrical and Electronics Engineers (IEEE) 802.11/Wi-Fi network and the like), a cellular network (e.g., 2G, 3G, and 4G networks, a Long Term Evolution (LTE) network, and the like), a circuit switched network (e.g., a public switched telephone network (PSTN)), a cable network, a digital subscriber line (DSL) network, a metropolitan area network (MAN), an Internet service provider (ISP) network, and the like. As such, in various examples the access points 141-144 may comprise wireless transceivers, cellular base stations, such as eNodeBs, and the like. In one example, the access networks 120 and 125 may include different types of networks. In another example, the access networks 120 and 125 may be the same type of network. In one example, the access networks 120 and 125 may be operated by a same entity as the core telecommunications network 110. In one example, the access networks 120 and 125 may also include NFVI that is controlled by the controller 115, e.g., nodes 193 and 194.

As illustrated in FIG. 1, the system 100 may further include mobile endpoint devices 181 and 182. Mobile endpoint devices 181 and 182 may comprise any type of wireless communication-capable mobile telephony and computing device (broadly, a "mobile device"), such as: a mobile phone, a smartphone, a computing tablet, a messaging device, a personal computer, a laptop computer, a Personal Digital Assistant (PDA), and the like. For instance, mobile endpoint devices 181 and 182 may be equipped with at least one cellular radio/transceiver for cellular communications. Mobile endpoint devices 181 and 182 may also be equipped for any number of different modes of communication. For instance, mobile endpoint devices 181 and 182 may alternatively or additionally be equipped with an IEEE 802.11 (Wi-Fi) transceiver, an IEEE 802.16 (e.g., wireless metropolitan area network/WiMAX) transceiver, an IEEE 802.15 transceiver (e.g., Bluetooth, ZigBee, etc.), and so on. In one example, the mobile endpoint devices 181 and 182 may be carried by a user and traveling in vehicles 161 and 162, which may comprise passenger vehicles, buses, vans, or the like.

As illustrated in FIG. 1, the system 100 may further include vehicle-based mobile SDN nodes 155 and 156. In one example, the vehicle-based mobile SDN nodes 155 and 156 may be deployed in vehicles 151 and 152, which may comprise semi-trucks, delivery trucks, delivery vans, buses, and so forth. The vehicle-based mobile SDN nodes 155 and 156 may include a cellular radio/transceiver for cellular communications. Vehicle-based mobile SDN nodes 155 and 156 may also be equipped for any number of different modes of communication. For instance, vehicle-based mobile SDN nodes 155 and 156 may alternatively or additionally be equipped with an IEEE 802.11 transceiver (e.g., a wireless router), an IEEE 802.16 transceiver, a Bluetooth transceiver, and so on. In one example, vehicle-based mobile SDN nodes 155 and 156 may also include satellite antennas for uplink and/or downlink satellite communications.

The vehicle-based mobile SDN nodes 155 and 156 may comprise host devices that are configurable and reconfigurable to provide various network services and/or to perform various tasks and functions under the instruction of controller 115. For example, vehicle-based mobile SDN nodes 155 and 156 may each include central processing units (CPUs), or processors, memory to hold computer-readable/computer-executable instructions, code, and/or programs, and so forth. Thus, in accordance with the present disclosure, the deployment of network services is extended to a fleet of vehicle-based mobile SDN nodes, e.g., including vehicle-based mobile SDN nodes 155 and 156. Nodes 191-194 may be used as alternative locations to deploy various network services, or may be used as support devices for vehicle-based mobile SDN nodes 155 and 156. For instance, any one or more of nodes 191-194 may host configuration code and/or content for various network services. Any one or more of nodes 191-194 may alternatively or additionally provide transcoding services, performing media compression, or perform any other network function that may be deployed in a host device/NFVI in a NFV architecture.

In one example, the nodes 191-194 and the vehicle-based mobile SDN nodes 155 and 156 may be managed by the controller 115. In one example, controller 115 may comprise an SDN controller that is responsible for such functions as provisioning and releasing instantiations of VNFs to perform the functions of routers, switches, and other devices, provisioning routing tables and other operating parameters for the VNFs, and so forth. In one example, controller 115 may maintain communications with VNFs and/or nodes 191-194 and vehicle-based mobile SDN nodes 155 and 156 via a number of control links. Control links may comprise secure tunnels for signaling communications over an underling IP infrastructure of core telecommunications network 110 and/or access networks 120 and 125. In other words, control links may comprise virtual links multiplexed with transmission traffic and other data carried over a shared set of physical links. In one example, the controller 115 may also comprise a virtual machine operating on NFVI/host device(s), or may comprise a dedicated device. For instance, controller 115 may be collocated with one or more VNFs, or may be deployed in a different host device or at a different physical location. In one example, the controller 115 may comprise a computing system or server, such as computing system 400 depicted in FIG. 4, and may be configured to assign a service to a vehicle-based mobile SDN node, as described herein. For instance, the controller 115 may be configured to perform the steps, functions, and/or operations of the method 200, described below, and/or to perform any other functions described herein.

In accordance with the present disclosure, the management functions of controller 150 may include the selection of vehicle-based mobile SDN nodes from among various vehicle-based mobile SDN nodes to host network services, and the instantiation of the network services, e.g., by downloading computer-executable/computer-readable instructions, code, and/or programs (broadly "configuration code") which, when executed by a processor of a selected vehicle-based mobile SDN node, may cause the vehicle-based mobile SDN node to perform functions or operations of one of the network services. In one example, controller 115 may download the configuration code for a network service to a vehicle-based mobile SDN node. In another example, controller 115 may instruct the vehicle-based mobile SDN node to load configuration code previously stored on the vehicle-based mobile SDN node and/or to retrieve the configuration code from another device in the system 100 that may store the configuration code for the network service. The management functions of controller 115 may also include the decommissioning of network services from the vehicle-based mobile SDN nodes when no longer required, and the transferring of network services to different vehicle-based mobile SDN nodes, e.g., when a vehicle-based mobile SDN node is offline, out of communication range of a mobile endpoint device, and so on.

As illustrated in the example of FIG. 1, vehicle-based mobile SDN nodes 155 and 156 may communicate with satellite 135 via satellite links 175 and 179, respectively. In one example, mobile endpoint devices 181 and 182 may also receive communications from satellite 135 via satellite links 177 and 178. However, the mobile endpoint devices 181 and 182 may be limited to receiving low-bandwidth downlink communications. For instance, mobile endpoint devices 181 and 182 may include GPS receivers for receiving GPS broadcasts from satellite 135. In one example, satellite 135 may communicate with a ground station 130 via satellite link 131. In one example, satellite 135 may be controlled and/or operated by a same network service provider as core telecommunications network 110. In another example, satellite 135 may be controlled and/or operated by a different entity and may carry communications between vehicle-based mobile SDN nodes 155 and 156 and core telecommunications network 110.

As further illustrated in FIG. 1, vehicle-based mobile SDN nodes 155 and 156 may be within communication range of access networks 120 and 125, respectively via links 172 and 174. For instance, links 172 and 174 may comprise cellular links to access points 141 and 143 respectively, which may comprise eNodeBs in such an example. Similarly, mobile endpoint devices 181 and 182 may be within communication range of access points 141 and 143 via links 170 and 171, respectively. For instance, links 170 and 171 may also comprise cellular links, where mobile endpoint devices 181 and 182 may also be equipped for cellular communications.

Mobile endpoint devices 181 and 182 may request services from core telecommunications network 110 via lines 170 and 171, access nodes 141 and 143, and access network 120 and 125, respectively. In one example, the service requests may be processed by controller 115. As mentioned above, the service requests may be for a voice or video call service, a conference call service, a streaming media service (broadly a media delivery service), a data access service, an Internet access service, and so forth. Each of the service requests may include an identification of the requesting mobile endpoint device, the service requested, any content requested in addition to the service, a bandwidth requirement, a latency requirement, and so forth. A request may also include geospatial parameters of the requesting mobile endpoint device, such as a location, a speed and direction, a planned route, and so forth. Alternatively, or in addition, the SDN controller may solicit the geospatial parameters of the mobile endpoint device after receiving the request, or may determine the geospatial parameters of the mobile endpoint device independently, e.g., using cellular base station estimation techniques, such as triangulation, signal strength correlations, and so forth. The controller 115 may then calculate where to physically place the services within the system 100.

To illustrate, mobile endpoint device 181 may request a streaming video service. The controller 115 may also receive or calculate a route for mobile endpoint device 181. In addition, the controller 115 may determine that mobile endpoint device 181 will be on a route that coincides with the route for vehicle-based mobile SDN node 155. The controller 115 may therefore determine that the streaming video service should be instantiated on the vehicle-based mobile SDN node 155. In one example, the controller 115 may transmit configuration code for the streaming video service to the vehicle-based mobile SDN node 155, e.g., via access network 120, access point 141 and link 174. In another example, the controller 115 may use the same communication pathway to transmit an instruction to the vehicle-based mobile SDN node 155 to retrieve the configuration code for the streaming video service from a network-based repository. For instance, the configuration code for the streaming video service may be stored at node 191 or node 193. As such, the vehicle-based mobile SDN node 155 may download the configuration code for the streaming video service from the network-based repository at an opportune time. For instance, the vehicle 151 may stop at a traffic light that is near access point 141. Vehicle-based mobile SDN node 155 may then attempt to download all or a portion of the configuration code for the streaming video service at this time. In one example, the controller 115 may also provide an identification of one or more mobile endpoint devices that may be permitted to access the streaming video service via the vehicle-based mobile SDN node 155, e.g., including at least the mobile endpoint device 181.

At any time after the configuration code for the streaming video service is installed in vehicle-based mobile SDN node 155, vehicle-based mobile SDN node 155 may then provide the streaming video service to the mobile endpoint device 181. For example, vehicles 161 and 151 may be traveling along a same portion of a highway and may be within wireless communication range via link 176. In one example, link 176 may comprise an IEEE 802.11, 802.15, or 802.16 connection, or the like. In another example, vehicle-based mobile SDN node 155 may function as a mobile cellular base station/access point, e.g., a femtocell or picocell. As such, in another example, link 176 may also comprise a cellular connection. In one example, the vehicle-based mobile SDN node 155 may periodically broadcast an identifier to announce the availability of the vehicle-based mobile SDN node 155. The mobile endpoint device 181 may periodically sense the wireless environment, and if within communication range via link 176, may detect the broadcast from vehicle-based mobile SDN node 155. The mobile endpoint device 181 may then establish communication with the vehicle-based mobile SDN node 155 by transmitting an identification of the mobile endpoint device 181 along with a request for service, receiving verification from the vehicle-based mobile SDN node 155, and so on.

In one example, the streaming video service may comprise a local service. In other words, the streaming video service may not require full network connectivity, e.g., to components of core telecommunications network 110. Thus, while the routes of the vehicle-based mobile SDN node 155 and the mobile endpoint device 181 may take the devices out of communication range of access network 120, the mobile endpoint device 181 may continue to receive the streaming video service from the vehicle-based mobile SDN node 155 so long as the two devices are within communication range of each other, e.g., via link 176. In another example, the streaming video service may still call for network connectivity. However, even if the vehicle-based mobile SDN node 155 and the mobile endpoint device 181 may be out of communication range of access network 120, network connectivity may be provided by the vehicle-based mobile SDN node 155 through satellite link 175, satellite 135, satellite link 131, and ground station 130. The vehicle-based mobile SDN node 155 may also store all or a portion of the streaming video content that may be requested by the mobile endpoint device 181. However, the vehicle-based mobile SDN node 155 may still communicate with core telecommunications network 110 and/or controller 115 to support the streaming video service. For instance, the vehicle-based mobile SDN node 155 may obtain advertising content from controller 115 or another component of the core telecommunications network 110 to interleave with the video stream that may be delivered to the mobile endpoint device 181.

After a service ending event, such as when the connection via the link 176 is lost, when the providing of the video content requested by the mobile endpoint device 181 is completed, after a predetermined time period has passed, when the vehicle 151 is turned off, etc., the streaming video service may be decommissioned from the vehicle-based mobile SDN node 155, and the vehicle-based mobile SDN node 155 may be reconfigured to provide a different service. However, in one example, the vehicle-based mobile SDN node 155 may retain a copy of the configuration code for the streaming video service, e.g., for a predetermined time period and/or for so long as there is storage or memory available. For instance, one or more recently used services may be re-instantiated on the vehicle-based mobile SDN node 155 without downloading the configuration code from a network-based repository or without the controller 115 sending the configuration code. As such, if another mobile endpoint device requests a streaming video service, with the same or a different video content requested, the streaming video service may be efficiently re-established on vehicle-based mobile SDN node 155.

In one example, mobile endpoint device 182 may request a voice call service, and the controller 115 may determine to instantiate the voice call service on vehicle-based mobile SDN node 156 in a similar manner as described above in connection with the establishment of the streaming video service on vehicle-based mobile SDN node 155. In one example, the voice call service may comprise a local service. For instance, the mobile endpoint device 182 may be requesting a voice call with mobile endpoint device 181, where the routes of mobile endpoint devices 181 and 182, and vehicle-based mobile SDN node 156 may coincide. In another example, the voice call service may call for network connectivity, which may be provided via link 172 or via link 179, e.g., depending upon whether the vehicle-based mobile SDN node 156 is within communication range of access point 143 in access network 125, whether the access point 143 is in-service and functioning correctly, and so forth. In the present example, the controller 115 may also determine that the routes of the mobile endpoint device 182 and vehicle-based mobile SDN node 156 may diverge or only partially overlap. However, for illustrative purposes, in one example, the controller may also determine that the route of mobile endpoint device 182 may coincide with the route of vehicle-based mobile SDN node 156. As such, the controller 115 may also instantiate the voice call service on vehicle-based mobile SDN node 155. Accordingly, the mobile endpoint device 182 may establish communications with vehicle-based mobile SDN node 156 via link 173 to receive the voice call service. Link 173 may comprise, for example, an IEEE 802.11, 802.15, or 802.16 connection, or the like, a cellular connection, and so forth. For example, the voice call service may result in the configuring of vehicle-based mobile SDN node 156 as a cellular base station, e.g., a picocell or femtocell, or as a Wi-Fi hotspot.

At a later time, the mobile endpoint device 182 may establish communications with vehicle-based mobile SDN node 155 to continue to receive the voice call service. For instance, mobile endpoint device 182 may be handed off to vehicle-based mobile SDN node 155 when the routes of the mobile endpoint device 182 and the vehicle-based mobile SDN node 156 diverge, or at some prior time and/or location where the mobile endpoint device 182 may be within communication range of both vehicle-based mobile SDN nodes 155 and 156.

It should be noted that the system 100 has been simplified. In other words, the system 100 may be implemented in a different form than that illustrated in FIG. 1. For example, the system 100 may be expanded to include additional networks, and additional network elements (not shown) such as border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices. Thus, these and other modifications of the system 100 are all contemplated within the scope of the present disclosure.

Figure 2:
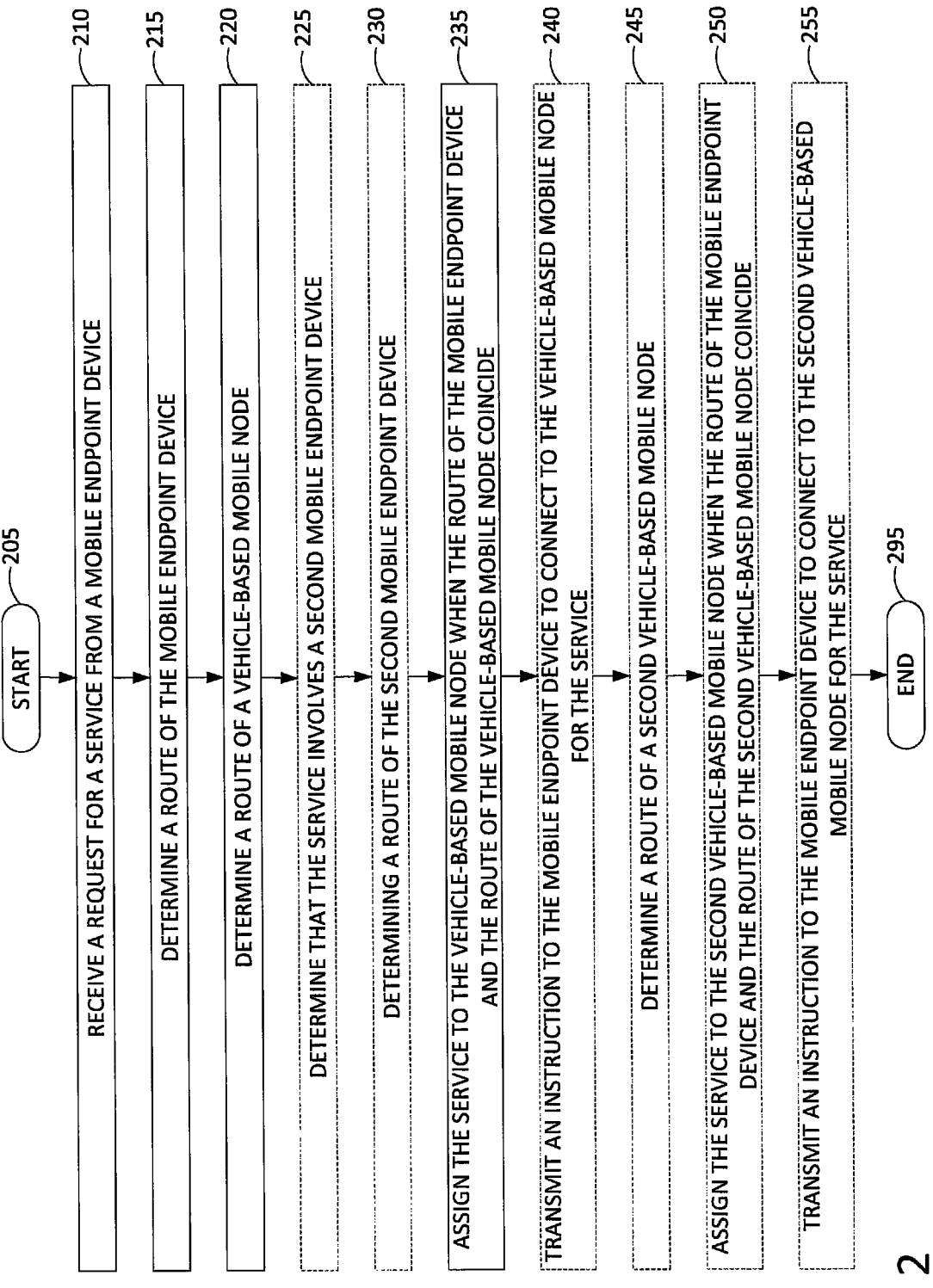
FIG. 2 illustrates a flowchart of an example method for assigning a service to a vehicle-based mobile node, in accordance with the present disclosure.

FIG. 2 illustrates a flowchart of an example method 200 for assigning a service to a vehicle-based mobile node, in accordance with the present disclosure. In one example, steps, functions and/or operations of the method 200 may be performed by a network-based device, such as controller 115 in FIG. 1, or controller 115 in conjunction with other components of the system 100. In one example, the steps, functions, or operations of method 200 may be performed by a computing device or system 400, and/or processor 402 as described in connection with FIG. 4 below. For instance, computing device or system 400 may represent a controller, e.g., a SDN controller. For illustrative purposes, the method 200 is described in greater detail below in connection with an example performed by a processor, such as processor 402. The method begins in step 205 and proceeds to step 210.

At step 210, the processor may receive a request for service from a mobile endpoint device. In one example, the service may comprise a network service such as voice or video call service, a conference call service, a streaming video service, a steaming audio service, and so forth. In one example, the request may be received when the mobile endpoint device is within communication range with a base station or wireless access point of a communication network via a cellular or non-cellular terrestrial wireless connection. In one example, the request from the mobile endpoint device may include one or more customized preferences of the user, e.g., selecting a particular type of user endpoint device to receive the service, a particular setting pertaining to bandwidth, latency, priority, cost, encoding type, type of display to be used, whether video will be used in a media delivery service or teleconferencing service, whether audio will be used in a media delivery service or teleconferencing service, and the like. In other words, the request may simply be associated with a standard service or a customized service that can be configured during the setup of the service or dynamically changed by the user while the service is being provided. This additional feature is in addition to the use of the vehicle-based mobile node as discussed below.

At step 215, the processor may determine a route for the mobile endpoint device. The route may be determined in a number of ways based upon various geospatial parameters. For example, a route may be calculated by a GPS navigation system associated with the mobile endpoint device and reported to the processor. In another example, the mobile endpoint device may report a current location and a speed and direction, e.g., a trajectory, and the processor may compare these parameters to a road map to determine a most likely route. In another example, the processor may determine a location, a speed, and/or a direction of travel using network-based resources, e.g., using base-station estimation techniques. Alternatively, or in addition, the route for the mobile endpoint device may be determined based upon a location indicated in an electronic calendar entry, a social media posting, or historic location information of the mobile endpoint device. For instance, a likely route may be determined based upon the time of day, day of week, etc., where the processor may have access to data indicative of the typical driving routes of the mobile endpoint device, such as routes for home-to-work, work-to-home, home-to-school, etc.

At step 220, the processor may determine a route of a vehicle-based mobile SDN node. In one example the route of the vehicle-based mobile SDN node may be determined in a same or a similar manner as the route of the mobile endpoint device is determined at step 215.

At optional step 225, the processor may determine that the service involves a second mobile endpoint device. For instance, the service may comprise a voice or video call, or a conference call involving the mobile endpoint device requesting the service and the second mobile endpoint device.

At optional step 230, the processor may determine the route of the second mobile endpoint device. In one example the route of the second mobile endpoint device may be determined in a same or a similar manner as the route of the mobile endpoint device is determined at step 215.

At step 235, the processor may assign the service to the vehicle-based mobile SDN node when the route of the mobile endpoint device and the route of the vehicle-based mobile SDN node coincide. For instance, the routes may coincide when the routes overlap or when a position of the mobile endpoint device at a projected time and a position of a the vehicle-based mobile SDN node at the same projected time are within (or are predicted to be within) a wireless communication range using any one of a variety of different cellular or non-cellular wireless communication components. In another example, the assigning the service to the vehicle-based mobile SDN node may comprise assigning the service to the vehicle-based mobile SDN node when the route of the mobile endpoint device and the route of the vehicle-based mobile SDN node coincide, and when the route of the mobile endpoint device includes at least a portion of the route that is outside a wireless coverage area of the communication network, e.g., including both cellular and/or non-cellular terrestrial wireless coverage regions. In still another example, the processor may assign the service to the vehicle-based mobile SDN node when the route of the mobile endpoint device, the route of the vehicle-based mobile SDN node, and the route of the second mobile endpoint device coincide (e.g., when the method 200 is performed inclusive of optional steps 225 and 230).

In one example, the assigning the service to the vehicle-based mobile SDN node comprises transmitting configuration code for the service to the vehicle-based mobile SDN node. For example, the configuration code may be transmitted via a cellular base station or wireless access point, via a satellite link, and so forth. In one example, all or a portion of the configuration code may be transmitted when the vehicle-based mobile SDN node is in a stationary position or when a speed of the vehicle-based mobile SDN node is below a threshold. In another example, step 235 may comprise the processor transmitting an instruction to the vehicle-based mobile SDN node to retrieve configuration code for the service from a repository device in the communication network. For instance, the processor may allow the vehicle-based mobile SDN node to decide when and if to retrieve the configuration code, or may instruct the vehicle-based mobile SDN node of times when retrieval is permitted, e.g., when the speed is below a threshold, or when a base station or access point is within a certain distance or signal-to-noise ratio, and so forth. The processor may select these restrictions or guidelines for the vehicle-based mobile SDN node so as to conserve bandwidth, reduce transmit power and interference, conserve battery charge, etc. In one example, the assigning the service to the vehicle-based mobile SDN node may further comprise providing an identifier of the mobile endpoint device for the vehicle-based mobile SDN node to use in determining whether to allow or deny a request to connect to the vehicle-based mobile SDN node for the service.

At optional step 240, the processor may transmit an instruction to the mobile endpoint device to connect to the vehicle-based mobile SDN node for the service. For instance, the instruction may include an identifier of the vehicle-based mobile SDN node. Accordingly, the mobile endpoint device may periodically sense the wireless environment to determine whether or not the identifier of the vehicle-based mobile SDN node is detected, and therefore whether the vehicle-based mobile SDN node is within wireless communication range.

At optional step 245, the processor may determine a route of a second vehicle-based mobile SDN node. For example, routes that are determined may be inaccurate or are subject to change as vehicles and the mobile endpoint devices and vehicle-based mobile SDN nodes transported in such vehicles change courses, deviate from historical route patterns, and so on. In addition, the routes of vehicle-based mobile SDN nodes and mobile endpoint devices may only partially overlap. Accordingly, a plurality of vehicle-based mobile SDN nodes may be used to host the service in order to provide redundant or parallel options for the mobile endpoint device. In one example, the route of the second vehicle-based mobile SDN node may at least partially coincide with the route of the first vehicle-based mobile SDN node. In another example, the route of the second vehicle-based mobile SDN node may not overlap or coincide at all with the route of the first vehicle-based mobile SDN node. It should be noted that in some cases, the service may be provided via fixed location network-based infrastructure in the event that suitable vehicle-based mobile SDN nodes are not available. However, in one example, one or several vehicle-based mobile SDN nodes may comprise a first choice for hosting the service. For instance, vehicle-based mobile SDN nodes may comprise a first choice for "local" services that do not require full network connectivity, services that do not have heightened security preferences, and so on.

At optional step 250, the processor may assign the service to the second vehicle-based mobile SDN node when the route of the mobile endpoint device and the route of the second vehicle-based mobile SDN node coincide. In one example, optional step 250 may comprise similar operations to those described above in connection with step 235.

At optional step 255, the processor may transmit an instruction to the mobile endpoint device to connect to the second vehicle-based mobile SDN node for the service. For instance, the instruction may include an identifier of the second vehicle-based mobile SDN node. In one example, optional step 255 may comprise similar operations to those described above in connection with optional step 240. In one example, the mobile endpoint device may connect to one or the other of the vehicle-based mobile SDN node and the second vehicle-based mobile SDN node. In one example, the mobile endpoint device may connect to the first vehicle-based mobile SDN node at a first time and along a first portion of a route, and may connect to the second vehicle-based mobile SDN node at a different time and along a different portion of the route.

Following step 240, or any of optional steps 245, 250, or 255, the method 200 may proceed to step 295. At step 295, the method 200 ends.

It should be noted that the method 200 may be expanded to include additional steps. For instance, in one example the method 200 may further include transferring the service to a fixed-location based SDN node from which the mobile endpoint device may receive the service at least along a portion of the route of the mobile endpoint device. In another example, the method 200 may include determining a capacity of the vehicle-based mobile SDN node, and assigning the service to the vehicle-based mobile SDN node when both the route of the mobile endpoint device and the route of the vehicle-based mobile SDN node coincide and when the capacity of vehicle-based mobile SDN node is sufficient to host the service. In another example, the vehicle-based mobile SDN node can simply decline a request or instruction to host the service when it determines that it does not have capacity. In another example, the processor may transmit an additional instruction to a different mobile endpoint device to receive the same service from one of the vehicle-based mobile SDN nodes. In still another example, the processor may determine that the routes of the first vehicle-based mobile SDN node and the second vehicle-based mobile SDN node may coincide, and may instruct the second vehicle-based mobile SDN node to retrieve the configuration code from the first vehicle-based mobile SDN node when within communication range of one another. Thus, these and other modifications are all contemplated within the scope of the present disclosure.

Figure 3:
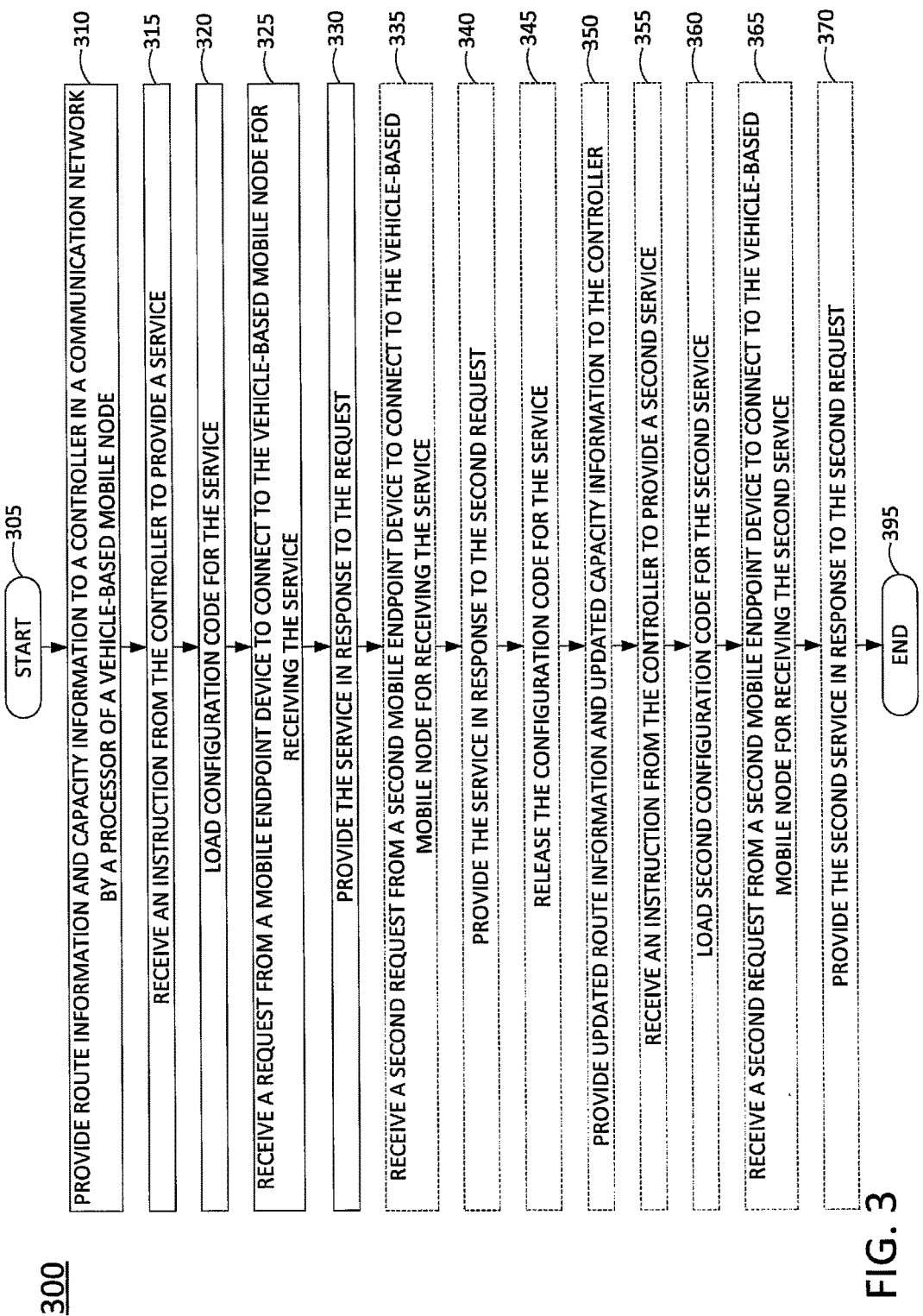
FIG. 3 illustrates a flowchart of an example method for providing a service by a vehicle-based mobile node, in accordance with the present disclosure.

FIG. 3 illustrates a flowchart of an example method 300 for providing a service by a vehicle-based mobile node, in accordance with the present disclosure. In one example, steps, functions and/or operations of the method 300 may be performed by a vehicle-based mobile SDN node, e.g., vehicle-based mobile SDN node 155 or 156, or vehicle-based mobile SDN node 155 or 156 in conjunction with other components of the system 100. In one example, the steps, functions, or operations of method 300 may be performed by a computing device or system 400, and/or processor 402 as described in connection with FIG. 4 below. For example, computing device or system 400 may represent a vehicle-based mobile SDN node. For illustrative purposes, the method 300 is described in greater detail below in connection with an example performed by a processor, such as processor 402. The method begins in step 305 and proceeds to step 310.

At step 310, the processor provides route information and capacity information to a controller, e.g., a SDN controller. The route information may include geospatial information such as a route, a current speed along the route, a direction of movement, and so forth. In one example, the route information may be calculated by a GPS navigation system associated with the mobile endpoint device. Alternatively, or in addition, the route information may be derived from an electronic calendar entry, a social media posting, or historic location information of the mobile endpoint device. In one example, the capacity information may identify a processor speed, a memory size, a storage size, the types of wireless transceivers and transmit powers available, and so forth.

At step 315, the processor receives an instruction from the controller to provide a service, e.g., a network service. For example, the controller may receive a request for the service from a mobile endpoint device, determine a route of the mobile endpoint device, determine a route of the vehicle-based mobile SDN node, and determine to assign the service to the vehicle-based mobile SDN node when the route of the mobile endpoint device and the route of the vehicle-based mobile SDN node coincide. In one example, the instruction may include configuration code for the service. In one example, the instruction may be received via a cellular base station or wireless access point, via a satellite link, and so forth. In one example, all or a portion of the configuration code may be received when the vehicle-based mobile SDN node is in a stationary position or when a speed is below a threshold. In another example, the instruction may direct the processor to retrieve configuration code for the service from a network-based repository in the communication network. In one example, the instruction may further include an identifier of the mobile endpoint device for the processor to use in determining whether to allow or deny a request for the service.

At step 320, the processor loads configuration code for the service. In one example, the configuration code is received in the instruction at step 315 and loaded into memory at step 320. In another example, the processor may retrieve the configuration code from a network-based repository in response to the instruction received at step 315 and may load the configuration code into memory. For instance, the processor may decide when and if to retrieve the configuration code, or may retrieve the configuration code at times when retrieval is permitted, e.g., when the speed is below a threshold, or when a base station or access point is within a certain distance or signal-to-noise ratio, and so forth. In still another example, the vehicle-based mobile SDN node may already have a stored copy of the configuration code in an attached storage, and the processor may load the configuration code into memory from the attached storage.

At step 325, the processor receives a request from a mobile endpoint device to connect to the vehicle-based mobile SDN node for receiving the service. In one example, the mobile endpoint device may be provided with specific instructions on connecting to the vehicle-based mobile SDN node for the service. In one example, the processor may broadcast a public identifier of the vehicle-based mobile SDN node wirelessly for detection by the mobile endpoint device if the mobile endpoint device and the processor, or the vehicle-based mobile SDN node of the processor are within wireless communication range.

At step 330, the processor provides the service in response to the request. In one example, the processor may provide the service when the mobile endpoint device corresponds to an identifier of the mobile endpoint device that was received at step 315. In another example, the processor may provide the service to any mobile endpoint device associated with the communication network that requests the service.

At optional step 335, the processor receives a second request from a second mobile endpoint device to connect to the vehicle-based mobile SDN node for the service. In one example, optional step 335 may comprise similar operations to those of step 325.

At optional step 340, the processor provides the service in response to the second request. In one example, the processor receives an identifier of the second mobile endpoint device from the controller to enable the processor to determine whether to allow or deny a request for the service. As such, the processor may provide the service when the second mobile endpoint device corresponds to the identifier of the second mobile endpoint device that was received from the controller. In another example, the processor may provide the service to any mobile endpoint device associated with the communication network that requests the service.

At optional step 345, the processor may release the configuration code for the service. For instance, the processor may decommission, flush, or overwrite the configuration code from memory and/or from storage after a predetermined time period has passed, when a vehicle powering the processor is turned off, when the vehicle exits a particular road, and so forth. However, in one example, a copy of the configuration code for the service may also be retained, e.g., for a predetermined time period and/or for so long as there is storage or memory available, so long as the storage or memory is not needed for another service, and so on.

At optional step 350, the processor provides updated route information and updated capacity information to the controller. For instance, a driver may change a route, the speed travelled along the route and a position along the route at a particular time may be different from what was anticipated, and so on. In addition, more or less mobile endpoint devices may connect to the processor, or the vehicle-based mobile SDN node of the processor, to receive the service or to receive a different service. As such, updated route information and updated capacity information may be provided to the controller to enable the controller to calculate whether the processor should continue to provide the service, whether the processor should provide a different service, or services, and so forth.

At optional step 355, the processor receives an instruction from the controller to provide a second service. In one example, optional step 355 may comprise similar operations to those of step 315.

At optional step 360, the processor may load second configuration code for the second service. For instance, the second configuration code may be provided in the instruction received at optional step 355, may be contained in storage of the vehicle-based mobile SDN node, may be retrieved by the processor from a network-based repository, and so on. In one example, optional step 360 may comprise similar operations to those of step 320.

At optional step 365, the processor receives a second request from a second mobile endpoint device to connect to the vehicle-based mobile SDN node for receiving the second service. In one example, optional step 365 may comprise similar operations to those of step 325.

At optional step 370, the processor provides the second service to the second mobile endpoint device in response to the second request. In one example, optional step 370 may comprise similar operations to those of step 330. It should be noted that the "second" mobile endpoint device referenced in optional steps 365 and 370 may comprise a same mobile endpoint device or a different mobile endpoint device from the "second" mobile endpoint device referenced in optional steps 335 and 340.

Following step 330, or any of optional steps 340-370, the method 300 may proceed to step 395. At step 395, the method 300 ends.

It should be noted that although not specifically specified, one or more steps, functions or operations of the respective methods 200 and 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 or FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 and 300 may comprise optional steps, or can be combined, separated, and/or performed in a different order from that described above, without departing from the example embodiments of the present disclosure.

As such, the present disclosure provides at least one advancement in the technical field of network function virtualization (NFV). For instance, examples of the present disclosure include network-based controllers for assigning services to a vehicle-based mobile SDN nodes and vehicle-based mobile SDN nodes for providing network services. By implementing network services in vehicle-based mobile nodes under the management of a controller, network services can be extended to locations that would otherwise be outside of the wireless coverage area of the network. In addition, for local services, network bandwidth and other resources may be conserved by opportunistically deploying such services in vehicle-based mobile SDN nodes. Latency for various services can also be reduced via opportunistic placement of services in vehicle-based mobile SDN nodes, in accordance with the present disclosure. Embodiments of the present disclosure improve the functioning of computing devices, e.g., servers. Namely, servers functioning as SDN controllers are improved in the examples of the present disclosure insofar as such example servers are configured to assign network services to vehicle-based mobile SDN nodes.

Figure 4:
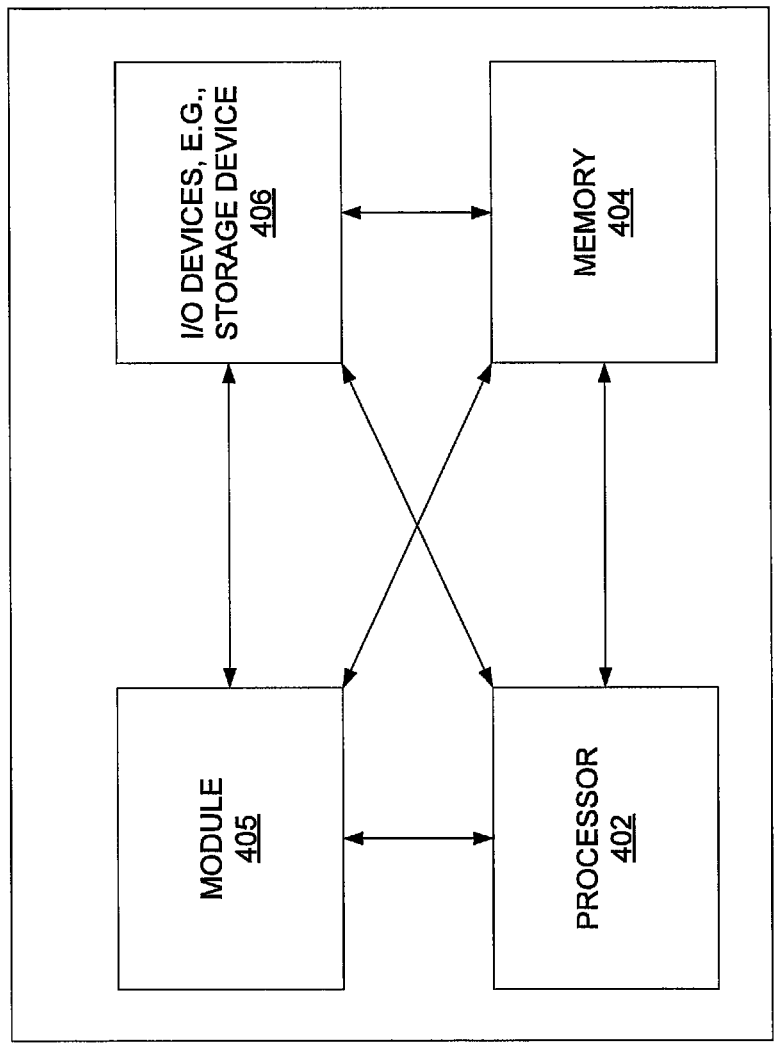
FIG. 4 illustrates an example high-level block diagram of a computer specifically programmed to perform the steps, functions, blocks, and/or operations described herein.

FIG. 4 depicts a high-level block diagram of a computing device programmed, or configured to perform the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for assigning a service to a vehicle-based mobile node or for providing a service by a vehicle-based mobile node, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or method 300, or the entire method 200 or method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method(s) discussed above can be used to configure a hardware processor to perform the steps, functions and/or operations of the above disclosed method 200 or method 300. In one embodiment, instructions and data for the present module or process 405 for assigning a service to a vehicle-based mobile node or for providing a service by a vehicle-based mobile node (e.g., a software program comprising computer-executable instructions) can be loaded into memory 404 and executed by hardware processor element 402 to implement the steps, functions or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for assigning a service to a vehicle-based mobile node or for providing a service by a vehicle-based mobile node (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
a processor deployed in a communication network; and
a non-transitory computer-readable medium storing instructions which, when executed by the processor, cause the processor to perform operations, the operations comprising:
receiving a request for a network service from a first mobile endpoint device;
determining an anticipated route of the first mobile endpoint device based on historic data associated with the first mobile endpoint device;
determining an anticipated route of a first vehicle-based mobile node based on historic data associated with the first vehicle-based mobile node; and
assigning the network service to the first vehicle-based mobile node when the anticipated route of the first mobile endpoint device and the anticipated route of the first vehicle-based mobile node coincide, wherein the assigning the network service to the first vehicle-based mobile node comprises transmitting a configuration code to the first vehicle-based mobile node for instantiating or reconfiguring the network service, wherein the configuration code is transmitted when the first vehicle-based mobile node is in a stationary position or when a speed of the first vehicle-based mobile node is below a threshold.

2. The device of claim 1, wherein the assigning the network service to the first vehicle-based mobile node comprises transmitting an instruction to the first vehicle-based mobile node to retrieve the configuration code for the network service from a repository device in the communication network.

3. The device of claim 1, wherein the operations further comprise:
transmitting an instruction to the first mobile endpoint device to connect to the first vehicle-based mobile node for the network service.

4. The device of claim 1, wherein the operations further comprise:
determining an anticipated route of a second vehicle-based mobile node based on historic data associated with the second vehicle-based mobile node; and
assigning the network service to the second vehicle-based mobile node when the anticipated route of the first mobile endpoint device and the anticipated route of the second vehicle-based mobile node coincide.

5. The device of claim 4, wherein the operations further comprise:
transmitting an instruction to the first mobile endpoint device to connect to the first vehicle-based mobile node and the second vehicle-based mobile node for the network service.

6. The device of claim 1, wherein the assigning the network service to the first vehicle-based mobile node further comprises assigning the network service to the first vehicle-based mobile node only when the anticipated route of the first mobile endpoint device includes at least a portion of the anticipated route of the first mobile endpoint device that is outside a wireless coverage area of the communication network.

7. The device of claim 1, wherein the determining the anticipated route of the first mobile endpoint device based on the historic data associated with the first mobile endpoint device is based upon one of: an anticipated route calculated by a global positioning system associated with the first mobile endpoint device, a trajectory of the first mobile endpoint device, an electronic calendar entry, a social media posting, a map, or historic location information of the first mobile endpoint device.

8. The device of claim 1, wherein the first vehicle-based mobile node includes a secondary communication link, and wherein the first mobile endpoint device does not include the secondary communication link.

9. The device of claim 1, wherein the operations further comprise:
determining that the network service that is requested involves a second mobile endpoint device; and
determining an anticipated route of the second mobile endpoint device based on historic data associated with the second mobile endpoint device, wherein the network service is assigned to the first vehicle-based mobile node when the anticipated route of the first mobile endpoint device, the anticipated route of the second mobile endpoint device, and the anticipated route of the first vehicle-based mobile node coincide.

10. The device of claim 9, wherein the network service comprises:
a voice call service;
a video call service;
a teleconference service;
an Internet access service;
a media delivery service; or
a data service.

11. The device of claim 1, wherein the anticipated route of the first mobile endpoint device and the anticipated route of the first vehicle-based mobile node coincide when a position of the first mobile endpoint device along the anticipated route of the first mobile endpoint device at a projected time and a position of the first vehicle-based mobile node along the anticipated route of the first vehicle-based mobile node at the projected time are within a wireless communication range.

12. A non-transitory computer-readable medium storing instructions which, when executed by a processor deployed in a communication network, cause the processor to perform operations, the operations comprising:
receiving a request for a network service from a mobile endpoint device;
determining an anticipated route of the mobile endpoint device based on historic data associated with the mobile endpoint device;
determining an anticipated route of a vehicle-based mobile node based on historic data associated with the vehicle-based mobile node; and
assigning the network service to the vehicle-based mobile node when the anticipated route of the mobile endpoint device and the anticipated route of the vehicle-based mobile node coincide, wherein the assigning the network service to the vehicle-based mobile node comprises transmitting a configuration code to the vehicle-based mobile node for instantiating or reconfiguring the network service, wherein the configuration code is transmitted when the vehicle-based mobile node is in a stationary position or when a speed of the vehicle-based mobile node is below a threshold.

13. The non-transitory computer-readable medium of claim 12, wherein the assigning the network service to the vehicle-based mobile node comprises transmitting an instruction to the vehicle-based mobile node to retrieve the configuration code for the network service from a repository device in the communication network.

14. The non-transitory computer-readable medium of claim 12, wherein the operations further comprise:

transmitting an instruction to the mobile endpoint device to connect to the vehicle-based mobile node for the network service.

15. A method comprising:

receiving, by a processor deployed in a communication network, a request for a network service from a first mobile endpoint device;

determining, by the processor, an anticipated route of the first mobile endpoint device based on historic data associated with the first mobile endpoint device;

determining, by the processor, an anticipated route of a first vehicle-based mobile node based on historic data associated with the first vehicle-based mobile node; and assigning, by the processor, the network service to the first vehicle-based mobile node when the anticipated route of the first mobile endpoint device and the anticipated route of the first vehicle-based mobile node coincide, wherein the assigning the network service to the first vehicle-based mobile node comprises transmitting a configuration code to the first vehicle-based mobile node for instantiating or reconfiguring the network service, wherein the configuration code is transmitted when the first vehicle-based mobile node is in a stationary position or when a speed of the first vehicle-based mobile node is below a threshold.

16. The method of claim 15, further comprising:

transmitting an instruction to the first mobile endpoint device to connect to the first vehicle-based mobile node for the network service.

17. The method of claim 15, further comprising:

determining an anticipated route of a second vehicle-based mobile node based on historic data associated with the second vehicle-based mobile node; and assigning the network service to the second vehicle-based mobile node when the anticipated route of the first mobile endpoint device and the anticipated route of the second vehicle-based mobile node coincide.

18. The method of claim 17, further comprising:

transmitting an instruction to the first mobile endpoint device to connect to the first vehicle-based mobile node and the second vehicle-based mobile node for the network service.

19. The method of claim 15, further comprising:

determining that the network service that is requested involves a second mobile endpoint device; and determining an anticipated route of the second mobile endpoint device based on historic data associated with the second mobile endpoint device, wherein the network service is assigned to the first vehicle-based mobile node when the anticipated route of the first mobile endpoint device, the anticipated route of the second mobile endpoint device, and the anticipated route of the first vehicle-based mobile node coincide.

20. The method of claim 19, wherein the network service comprises:

a voice call service;
a video call service;
a teleconference service;
an Internet access service;
a media delivery service; or
a data service.

* * * * *